(12) United States Patent
Hsu

(10) Patent No.: US 6,713,700 B2
(45) Date of Patent: Mar. 30, 2004

(54) ELEVATABLE KEY SWITCH AND KEYBOARD WITH THE SAME

(75) Inventor: Chien-Shih Hsu, Taipei (TW)

(73) Assignee: Darfon Electronics Corp., Taoyuan (TW)

( * ) Notice: Subject to any disclaimer, the term of this patent is extended or adjusted under 35 U.S.C. 154(b) by 0 days.

(21) Appl. No.: 10/407,400

(22) Filed: Apr. 4, 2003

(65) Prior Publication Data

US 2003/0188960 A1 Oct. 9, 2003

(30) Foreign Application Priority Data

Apr. 9, 2002 (TW) ........................... 91107047 A

(51) Int. Cl.[7] .............................................. H01H 13/70
(52) U.S. Cl. ................... 200/344; 200/5 A; 361/680
(58) Field of Search ................. 200/5 R, 5 A, 200/341–345; 341/22–35; 345/158–169; 361/679–682

(56) References Cited

U.S. PATENT DOCUMENTS 5,772,008 A * 6/1998 Yu et al. ................... 200/344
5,793,605 A * 8/1998 Sellers ....................... 361/680
6,172,868 B1 * 1/2001 Oura ........................... 361/580

* cited by examiner

Primary Examiner—James R. Scott
(74) Attorney, Agent, or Firm—Snell & Wilmer L.L.P.

(57) ABSTRACT

An elevatable key switch and a keyboard with the elevatable key switch are provided. The elevatable key switch includes a base, a cap, an up-down mechanism, an elastic member, a movable element, and a driving element. The cap is disposed above the base. The up-down mechanism, which is disposed between the base and the cap, supports the cap to perform vertical movement relative to the base. The elastic member is disposed on the base, and the movable element is movably disposed on the elastic member. The driving element drives the movable element to make substantial horizontal movement, so that the movable element selectively moves between a first position and a second position. When the movable element is in the first position, the movable element supports the up-down mechanism in an operation configuration. When the movable element is in the second position, the movable element releases the up-down mechanism entering a contraction configuration.

24 Claims, 12 Drawing Sheets

ELEVATABLE KEY SWITCH AND KEYBOARD WITH THE SAME

CROSS REFERENCE TO RELATED APPLICATIONS

This application claims priority to Taiwan Patent Application No. 091107047 entitled "Elevated Key Switch and Keyboard with the Elevated Key Switch", filed Apr. 9, 2002.

FIELD OF INVENTION

The present invention generally relates to an elevatable key switch and, more particularly, to a scissors-like elevatable key switch and a keyboard having the same.

BACKGROUND OF THE INVENTION

Keyboards are widely used with various devices, such as computers, to input characters and numerals. To make a key on the keyboard easy to depress, the key is usually designed to function no matter where a force is exerted on the key cap. In other words, even though the force is exerted on the edge of the cap, the force is generally equally distributed over the entire surface of the cap with a scissors-like linkage. Furthermore, while space is an especially important consideration in designing keyboards of portable computing devices, key switches with scissors-like linkage are often the solution.

The height of key switches usually affects the size of a portable computing device and especially directly influences the thickness of a notebook computer. In order to reduce the overall thickness of a notebook computer, therefore, a common answer is to minimize the keystroke distance to reduce the height of key switches. However, the reduction of the keystroke distance also reduces the user's sense of touch. Thus, reducing the height of key switches when a notebook is in closed storage configuration is another possible solution.

A conventional key switch of scissors-like linkage is disclosed in U.S. Pat. No. 5,793,605. As shown in FIG. 8A, scissors-like linkage 810 includes a joining plate 812, which depresses resilient dome 820 to activate the key switch 800. When the key switch 800 is not in use, the resilient dome 820 must move a distance relative to the scissors-like linkage 810, so that the key switch 800 collapses. However, the size of the resilient dome 820, which is relatively large, determines the required distance for the key switch 800 to collapse, as shown in FIG. 8B. Furthermore, the impact force of the scissors-like linkage is relatively large. If the joining plate 812 cannot equally distribute the force on the resilient dome 820, the resilient dome 820 is easily damaged.

Thus, there is a need to provide a key switch and a keyboard to eliminate problems of the prior art.

OBJECTS AND SUMMARY OF THE INVENTION

It is one aspect of the present invention to provide a key switch, which can selectively be in an operation configuration and a contraction configuration.

It is another aspect of the present invention to provide an elevatable key switch, which can collapse to reduce height of the key switch when the key switch is not in use.

It is a further aspect of the present invention to provide a key switch with a movable element, which maintains the impact of key cap in a uniform level.

In one embodiment, the present invention provides an elevatable key switch including a base, a cap, an up-down mechanism, an elastic member, a movable element, and a driving element. The cap is disposed above the base. The up-down mechanism, which is disposed between the base and the cap, supports the cap to perform vertical movement relative to the base. The elastic member is disposed on the base, and the movable element is movably disposed on the elastic member. The driving element drives the movable element to make substantial horizontal movement, so that the movable element selectively moves between a first position and a second position. When the movable element is in the first position, the movable element supports the up-down mechanism in an operation configuration. When the movable element is in the second position, the movable element releases the up-down mechanism entering a contraction configuration.

A collapsible keyboard including a casing and the elevatable key switch of the present invention is also provided. When the keyboard is not in use, the up-down mechanism is collapsed to enter a contraction configuration resulting in the reduction of height of the elevatable key switch.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION

The present invention provides an elevatable key switch, which can collapse to reduce the height of the key switch when not in use.

Figure 1A:
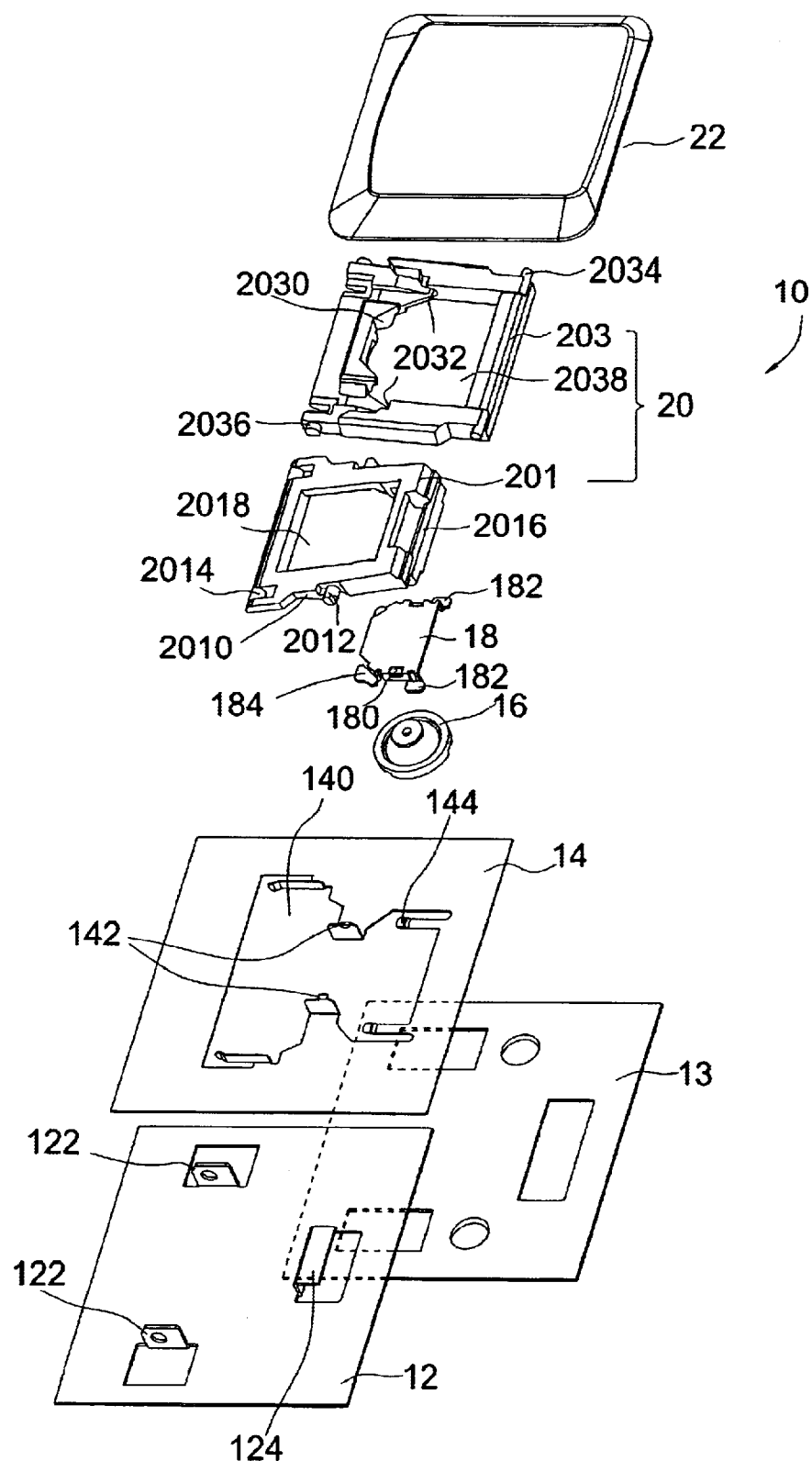
FIG. 1A illustrates an explosive view of a first embodiment of an elevatable key switch in accordance with the present invention.
Figure 2A:
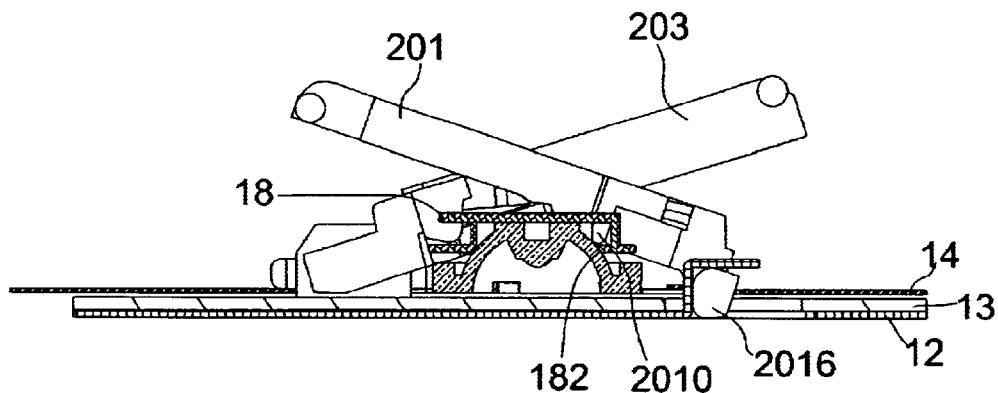
FIG. 2A illustrates a cross-sectional view of the first embodiment when the key switch is in operation configuration.
Figure 2B:
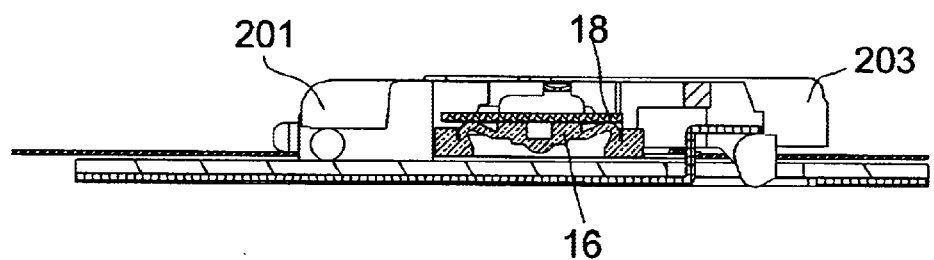
FIG. 2B illustrates a cross-sectional view of the first embodiment when the key switch is activated.
Figure 3:
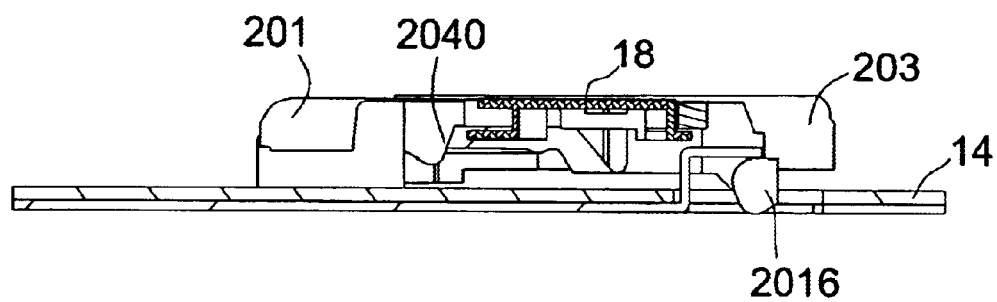
FIG. 3 illustrates a cross-sectional view of the first embodiment when the key switch is in contraction configuration.

In FIGS. 1 to 3, a first exemplary embodiment of the elevatable key switch is illustrated. As shown in FIG. 1A, the elevatable key switch 10 includes a base 12, a membrane circuit 13, a driving element 14, an elastic member 16, a movable element 18, an up-down mechanism 20, and a cap 22. The membrane circuit 13, which has a contact (not shown) corresponding to the cap 22, is disposed between the driving element 14 and the base 12. The cap 22 is disposed above the base 12. The up-down mechanism 20, which is disposed between the base 12 and the cap 22, is configured to support the cap 22 to perform vertical movement relative to the base 12.

Figure 1B:
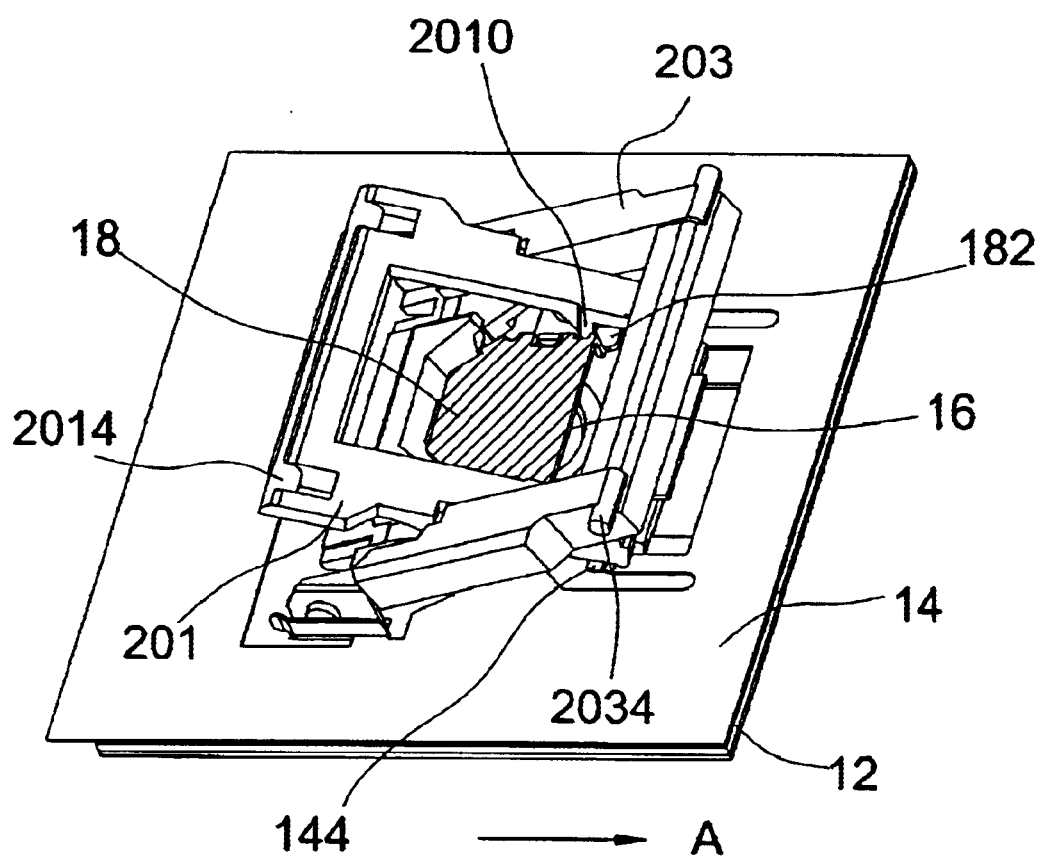
FIG. 1B illustrates a perspective view of the first embodiment of the present invention.

FIG. 1A and FIG. 1B, which is a perspective view of FIG. 1A, are both referred to hereinafter. To make explanation easier, the cap 22 is illustrated only in FIG. 1A. The up-down mechanism 20 includes a first arm 201 and a second arm 203. The first arm 201 has a pivot 2012 rotatably connecting to groove 2032 near the middle of the second arm 203 to form a scissors-like linkage. The upper ends (2014 and 2034) of the up-down mechanism 20 are coupled to connection portions (not shown) of the cap 22. The lower ends (2016 and 2036) of the up-down mechanism 20 are coupled to a connection portion 122 and a connection part 124 of the base 12 respectively. In such arrangement, the cap 22 can perform vertical movement relative to the base 12. The first arm 201 of the up-down mechanism 20 has a first opening 2018 and further includes a first projection 2010, which is disposed on about midpoint of the first arm 201. The second arm 203 has a second opening 2038 and further includes a second projection 2030, which is disposed near the lower end 2036. The elastic member 16 is disposed on the base 12 and received in the first and second openings (2018 and 2038).

The movable element 18, which is movably disposed on the elastic member 16, includes a groove portion 180, a first receiving portion 182, and a second receiving portion 184. The driving element 14 is disposed on the base 12 and configured to drive the movable element 18 to make substantial horizontal movement. The groove portion 180 of the movable element 18 is coupled to a supporting portion 142 of the driving element 14, so that the movable element 18 moves in response to movement of the driving element 14. The driving element 14 further includes an opening portion 140. The supporting portion 142 is disposed on the periphery of the opening 140, and the elastic member 16 is disposed on the base 12 through the opening 140.

In such arrangement, the movable element 18 can selectively move between a first position and a second position in response to movement of the driving element 14. When the movable element 18 is in the first position, the first receiving portion 182 supports the first projection 2010 of the first arm 201, and the second receiving portion 184 supports the second projection 2030 of the second arm 203. Thus, the first and second projections 2010 and 2030 of the up-down mechanism 20 and the first and second receiving portions 182 and 184 are configured as a fulcrum, so that the up-down mechanism 20 is in an operation configuration, as shown in FIG. 2A. When the up-down mechanism 20 is in the operation configuration, striking the key cap makes the movable element 18 push the elastic member 16 downward to activate the key switch 10 because of the mechanic relationship between the up-down mechanism 20 and the movable element 18, as shown in FIG. 2B.

As shown in FIGS. 1B and 3, when the driving element 14 drives the movable element 18 to move along direction A, the movable element 18 moves from the first position to the second position. At the same time, the first and second receiving portions 182 and 184 release the first and second projections 2010 and 2030, so that the up-down mechanism 20 loses support and comes down entering a contraction configuration. When the up-down mechanism 20 is in the contraction configuration, the key switch 10 cannot be operated. Furthermore, the driving element 14 has an upward slanted surface 144 corresponding to the connection part 124 of the base 12. The lower end 2016 of the first arm is slidably and rotatably connected to the connection part 124 and against the driving element 14. When the driving element 14 drives the movable element 18 to move from the first position to the second position, the upward-slanted surface 144 pushes the lower end 2016 upward and toward the second position, so that the up-down mechanism 20 comes down entering the contraction configuration.

Figure 4A:
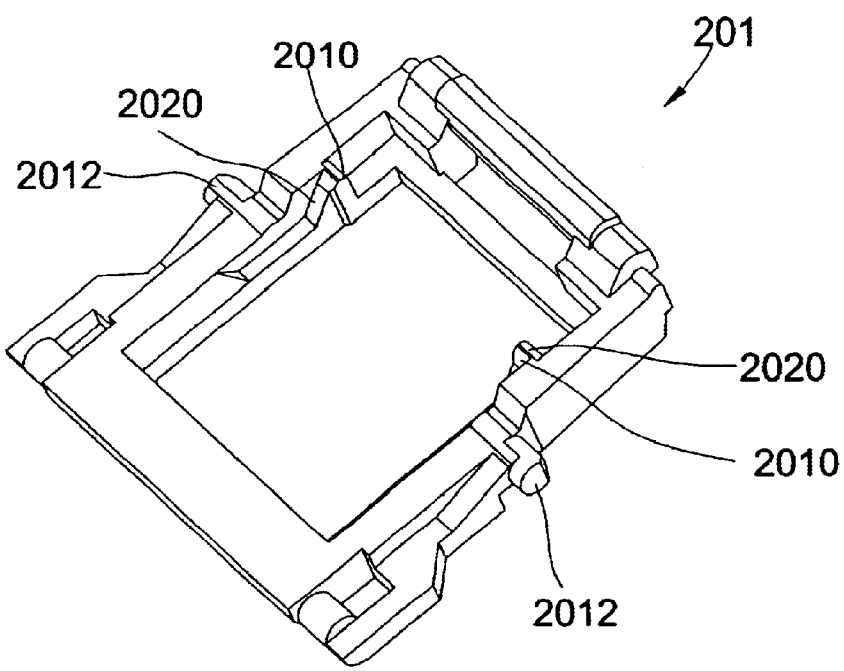
FIG. 4A illustrates a perspective view of a first arm of the first embodiment with the bottom side facing the viewer.
Figure 4B:
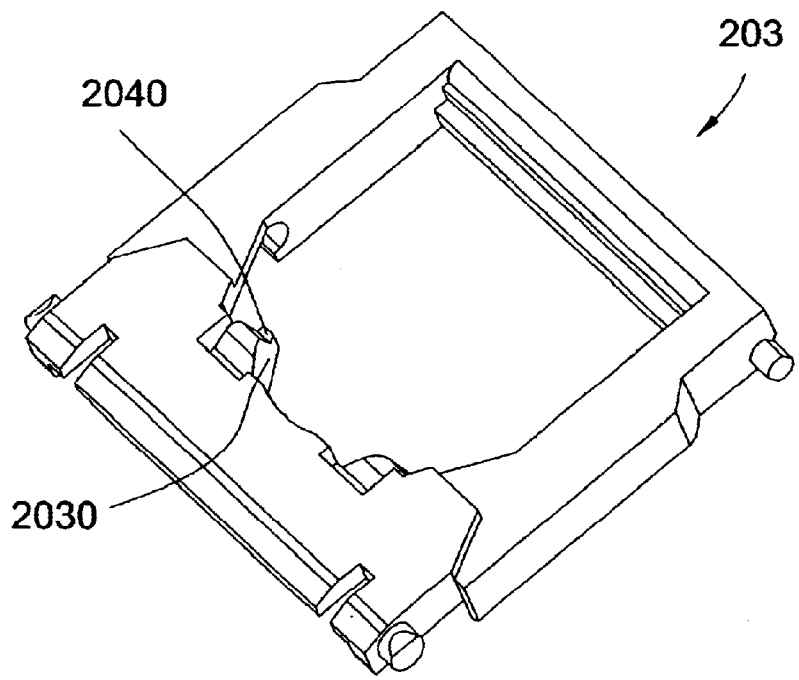
FIG. 4B illustrates a perspective view of a second arm of the first embodiment with the bottom side facing the viewer.

Furthermore, FIGS. 4A and 4B respectively illustrate the first arm 201 and the second arm 203 of the up-down mechanism 20 with the bottom side (the side contacting the movable element 18) facing viewers. The first projection 2010 of the first arm 201 further has a first slanted bottom surface 2020, and the second projection 2030 of the second arm 203 further has a second slanted bottom surface 2040. When the driving element 14 drives the movable element 18 to move from the second position to the first position, the driving element 14 lifts the up-down mechanism 20 along the first and second slanted bottom surfaces 2020 and 2040, so that the key switch 10 is in operation configuration.

FIGS. 5 to 7 illustrate a second exemplary embodiment of the elevatable key switch of the present invention. FIG. 5A is an explosive view of the elevatable key switch 50, which includes a base 52, a cap 62, an up-down mechanism 60, an elastic member 56, a movable element 58, and a driving element 54. The cap 62 is disposed above the base 52. The up-down mechanism 60 is disposed between the base 52 and the cap 62 and configured to support the cap 62 to perform vertical movement relative to the base 52.

Figure 5A:
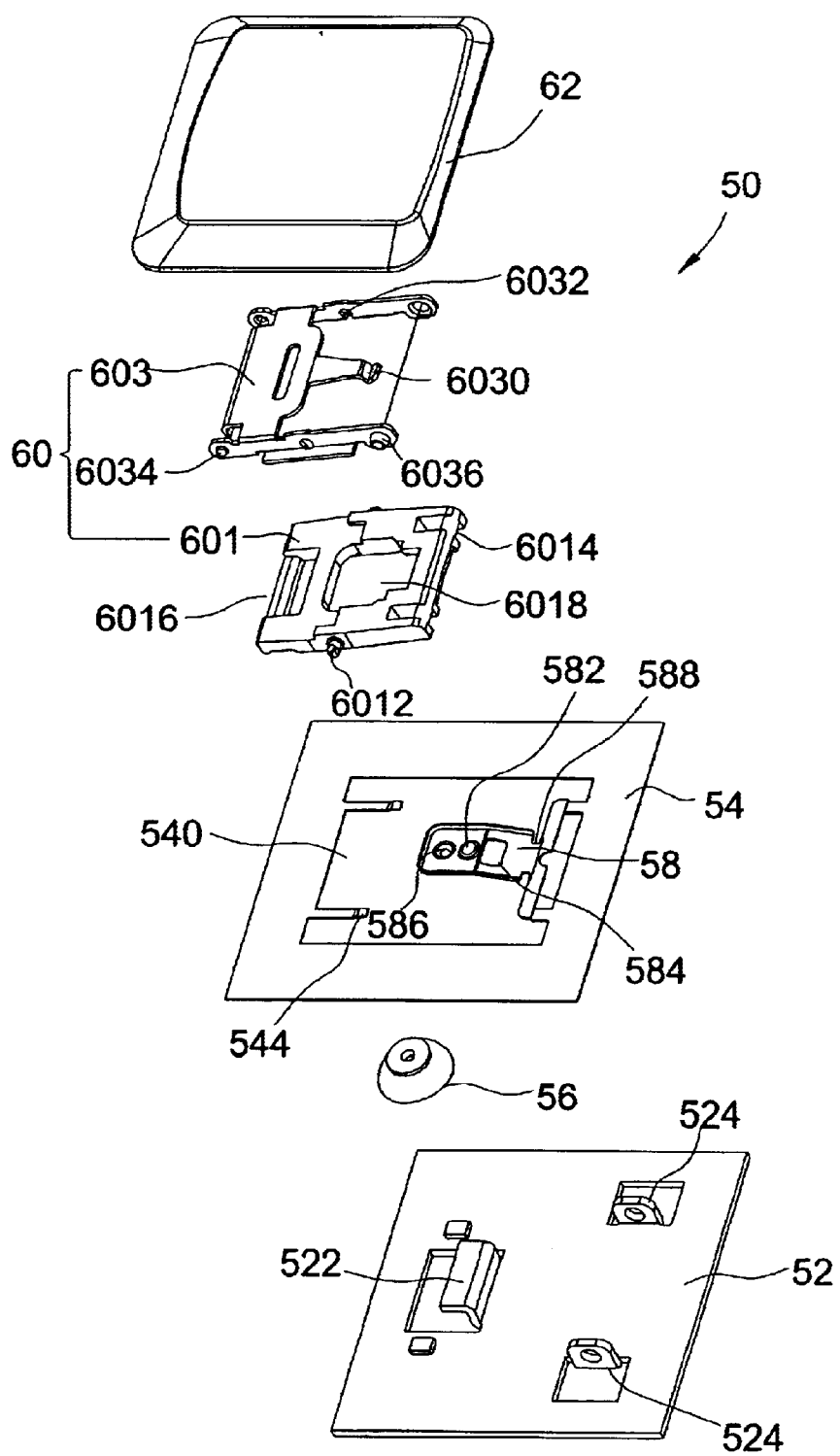
FIG. 5A illustrates an explosive view of a second embodiment of an elevatable key switch in accordance with the present invention.
Figure 5B:
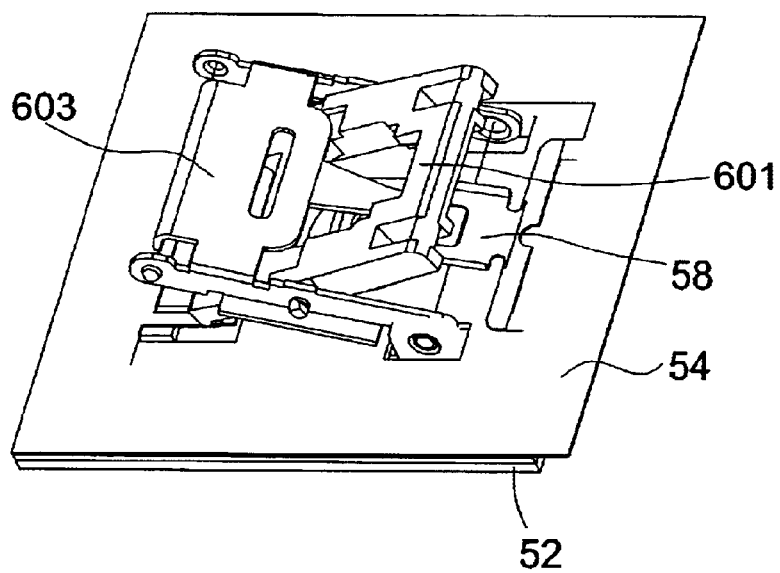
FIG. 5B illustrates a perspective view of the second embodiment.

FIG. 5A and FIG. 5B, which is a perspective view of FIG. 5A, are both referred to hereinafter. To make explanation easier, the cap 62 is illustrated only in FIG. 5A. The up-down mechanism 60 includes a first arm 601 and a second arm 603. The first arm 601 is pivotally connected to the second arm 603 to form a scissors-like linkage. The first arm 601 has a pivot 6012 rotatably connected to groove 6032 near the middle of the second arm 603 to form the scissors-like linkage. The upper ends (6014 and 6034) of the up-down mechanism 60 are coupled to connection portions (not shown) of the cap 62. The lower ends (6016 and 6036) of the up-down mechanism 60 are coupled to a connection portion 524 and a connection part 522 of the base 52 respectively. In such arrangement, the cap 62 can perform vertical movement relative to the base 52. The first arm 601 of up-down mechanism 60 has a first opening 6018. The elastic element 56 is disposed on the base 52 and received in the first opening 6018. The second arm 603 includes a flexible projection 6030, which has a curved end to increase impact force during operation.

The movable element 58 including a receiving portion 582, an accommodation portion 584, and an acting portion 586 is movably disposed on the elastic member 56. The driving element 54 is disposed on the base 52. The driving element 54 has an opening portion 540, through which the elastic member 56 is disposed on the base 52. The driving element 54 is configured to drive the movable element 58 to make substantial horizontal movement, so that the movable element 58 selectively moves between a first position and a second position in response to movement of the driving element 54. The driving element 54 has a supporting portion 588, which projects from the base 52 and supports the movable element 58 upwardly slantedly projecting above the opening 540. Therefore the movable element 58 selectively moves between the first position and the second position in response to movement of the driving element 54. It is noted that the movable element 58 and the driving element 54 can be formed as an integral unit. Furthermore, the receiving portion 582 can be a planar surface of the movable element 58 or a projection surface on the movable element 58. The accommodation portion 584 can be a groove or a hole, and the acting portion 586 can be a downward protrusion of the movable element 58.

Figure 5C:
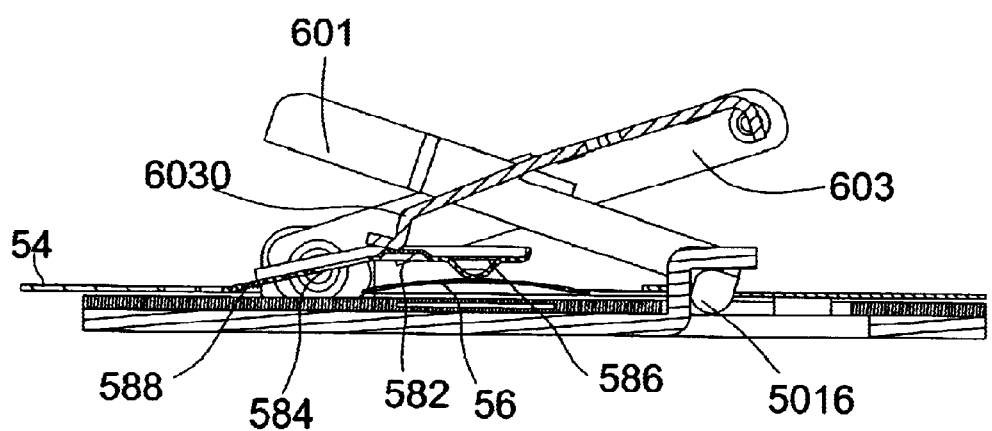
FIG. 5C illustrates a cross-sectional view of the second embodiment when the key switch is in operation configuration.
Figure 5D:
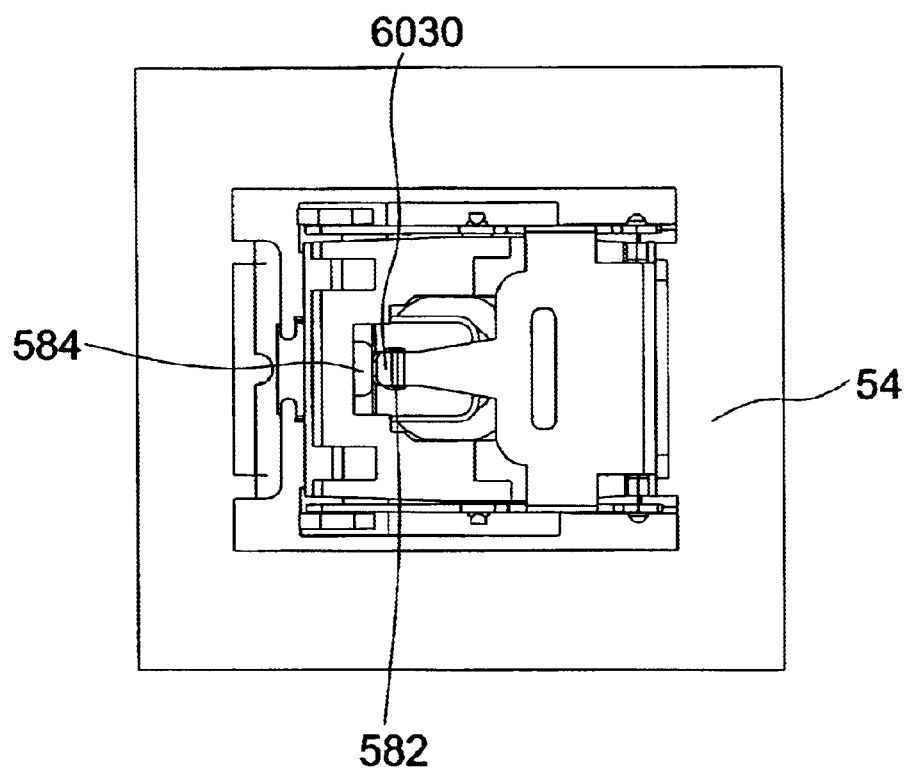
FIG. 5D illustrates a top view of the second embodiment when the key switch is in operation configuration.
Figure 6A:
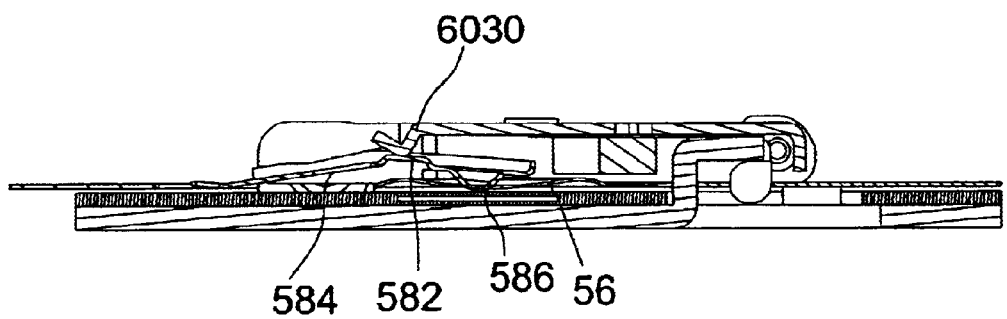
FIG. 6A illustrates a cross-sectional view of the second embodiment when the key switch is activated.
Figure 6B:
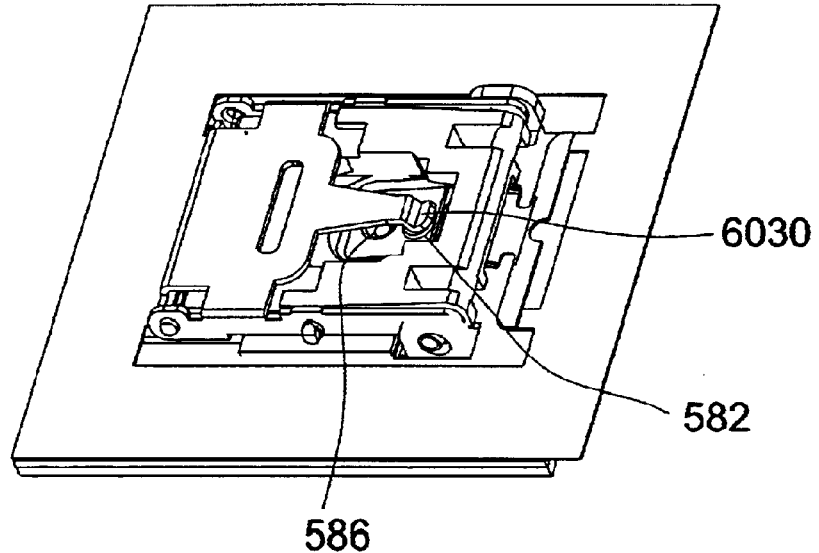
FIG. 6B illustrates a perspective view of FIG. 6A.

As shown in FIGS. 5C and 5D, when the movable element 58 is in the first position, the first receiving portion 582 supports the projection 6030, so that the up-down mechanism 60 is in operation configuration. When the key cap 62 is struck, the projection 6030 of the up-down mechanism 60 impacts against the receiving portion 582 of the movable element 58, so that the acting portion 586 of the movable element 588 pushes the elastic member 56 downward to activate the key switch 50, as shown in FIGS. 6A and 6B. FIGS. 6A and 6B respectively illustrate a cross-sectional view and a perspective view of the key switch 50 being activated.

Figure 7A:
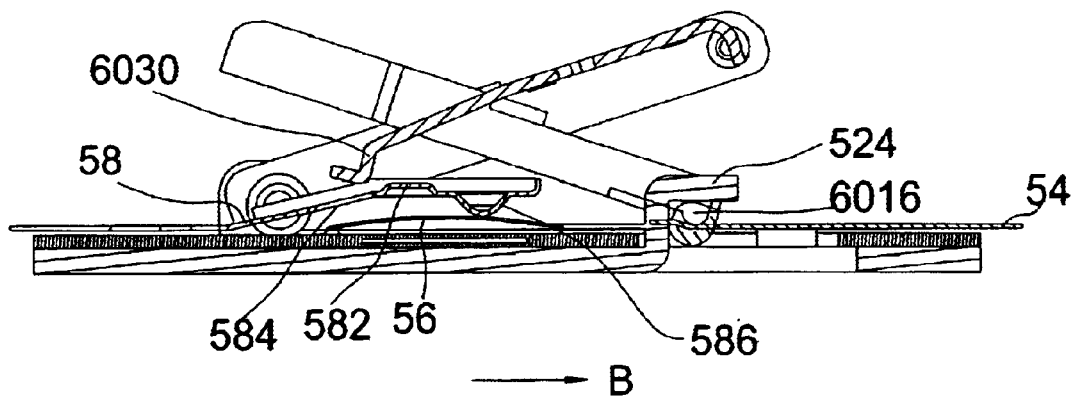
FIG. 7A illustrates a cross-sectional view of the second embodiment when the movable element releases the up-down mechanism.
Figure 7B:
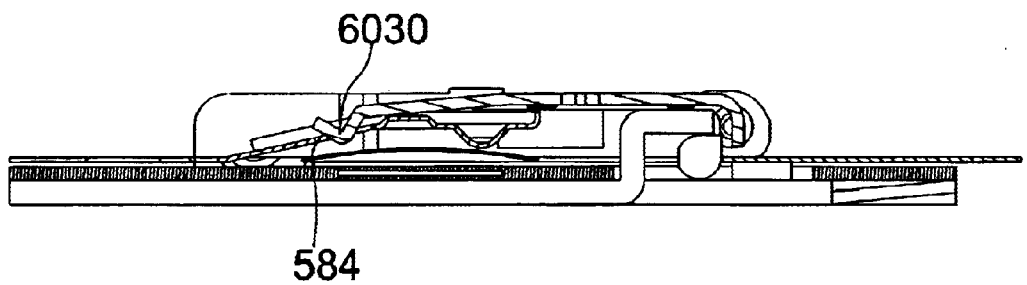
FIG. 7B illustrates a cross-sectional view of the second embodiment when the up-down mechanism is in contraction configuration.
Figure 7C:
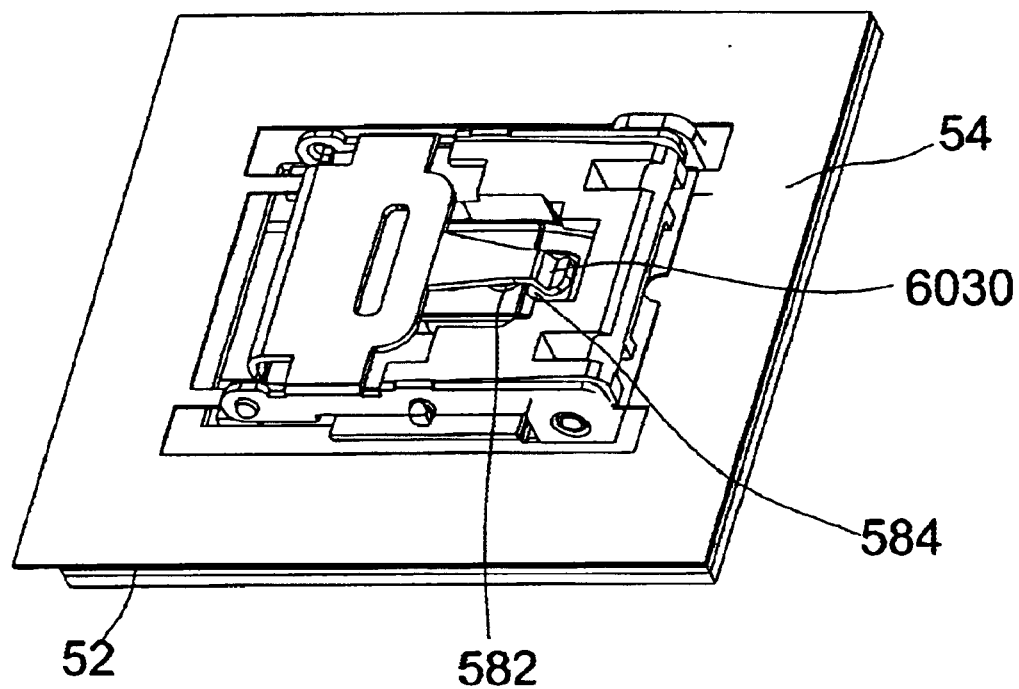
FIG. 7C illustrates a perspective view of FIG. 7B.
Figure 8A:
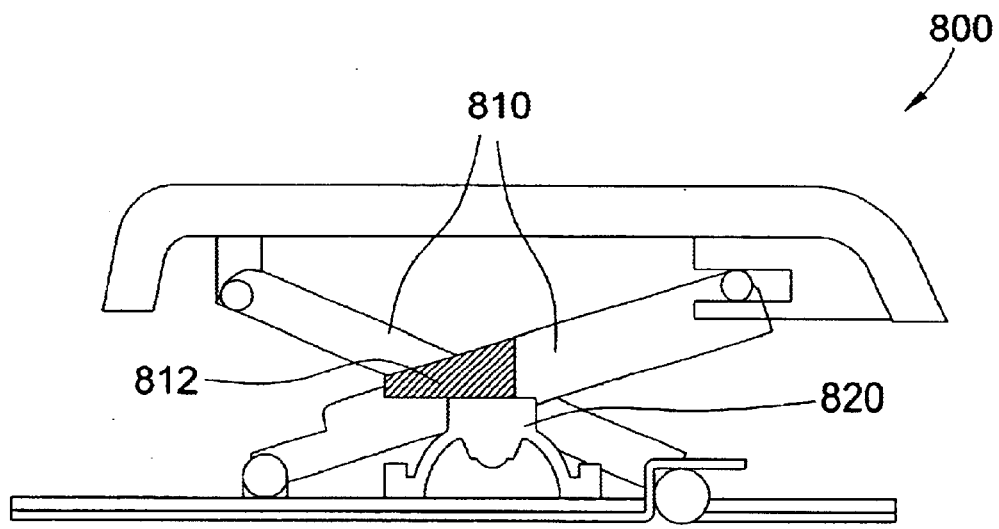
FIG. 8A illustrates a cross-sectional view of a conventional key switch when the key switch is activated.
Figure 8B:
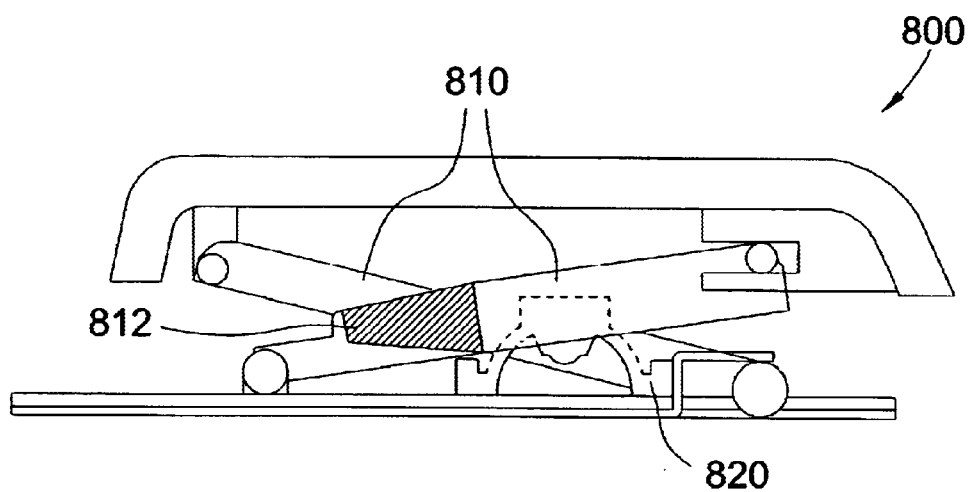
FIG. 8B illustrates a cross-sectional view of the conventional key switch when the key switch is in contraction configuration showing that the elastic member moves relative to the scissors-like linkage.

Referring to FIGS. 7A, 7B, and 7C, when the driving element 54 drives the movable element 58 to move along direction B, the movable element 58 moves from the first position to the second position. At the same time, the receiving portion 582 releases the projection 6030, so that the projection 6030 is received in the accommodation portion 584, and the up-down mechanism 20 loses support and comes down entering a contraction configuration. When the up-down mechanism 60 is in the contraction configuration, the key switch 60 cannot be operated.

Furthermore, the driving element 54 has an upward-slanted surface 544 corresponding to the connection part 522 of the base 12. The lower end 6016 of the first arm 601 is slidably and rotatably connected to the connection part 522 and against the driving element 54. When the driving element 54 drives the movable element 58 to move from the first position to the second position, the upward slanted surface 544 pushes the lower end 6016 upward and toward the second position, so that the up-down mechanism 60 comes down entering the contraction configuration.

A collapsible keyboard including a casing and the elevatable key switch (10 or 50) of the present invention is also provided. When the keyboard is not in use, the up-down mechanism (20 or 60) collapses to enter a contraction configuration resulting in the reduction of height of the elevatable key switch, and therefore the keyboard is convenient for storage.

It is noted that in the first and second embodiments, the driving element drives the movable element to selectively move between the first position and the second position, which varies the relative positions of the projection of the up-down mechanism and the receiving portion of the movable element. When the movable element is in the first position, the movable element supports the up-down mechanism, and therefore the key switch is operable. When the movable element is in the second position, the movable element releases the up-down element to make it enter the contraction configuration, and therefore the height of the key switch is reduced.

Although specific embodiments have been illustrated and described, it will be obvious to those skilled in the art that various modifications may be made without departing from what is intended to be limited solely by the appended claims.

What is claimed is:

1. An elevatable key switch, comprising:
   a base;
   a cap disposed above said base;
   an up-down mechanism, disposed between said base and said cap, configured to support said cap to perform vertical movement relative to said base;
   an elastic member disposed on said base; and
   a movable element movably disposed on said elastic member;
   wherein said movable element supports said up-down mechanism in an operation configuration when said movable element is in a first position, and said movable element releases said up-down mechanism entering a contraction configuration when said movable element is in a second position.

2. The elevatable key switch according to claim 1, wherein said up-down mechanism comprises a first arm and a second arm, said first arm is pivotally connected to said second arm to form a scissors-like linkage.

3. The elevatable key switch according to claim 1, wherein said up-down mechanism further comprises a projection, said movable element has a receiving portion, wherein said receiving portion receives said projection when said movable element is in said first position, and wherein said receiving portion releases said projection when said movable element is in said second position.

4. The elevatable key switch according to claim 3, wherein said movable element further comprises an accommodation portion configured to accommodate said projection when said movable element is in said second position.

5. The elevatable key switch according to claim 1 further comprising a driving element, disposed on said base, configured to drive said movable element to make substantial horizontal movement, so that said movable element selectively moves between said first position and said second position.

6. The elevatable key switch according to claim 5, wherein said movable element has a groove portion coupling to a supporting portion of said driving element, so that said movable element moves responsive to movement of said driving element.

7. The elevatable key switch according to claim 5, wherein said movable element and said driving element are formed integrally, so that said movable element moves responsive to movement of said driving element.

8. The elevatable key switch according to claim 5, wherein said up-down mechanism comprises a first arm and a second arm, said base further comprises a connection part, wherein a lower end of said first arm is coupled to said connection part, said driving element has an upward slanted surface corresponding to said lower end, and wherein said upward slanted surface pushes said lower end toward said second position when said driving element drives said movable element to move from said first position to said second position.

9. The elevatable key switch according to claim 5, wherein said up-down mechanism comprises a first arm and a second arm; said projection further comprises a first slanted bottom surface disposed on said first arm; said second arm further comprises a second projection with a second slanted bottom surface; and wherein said driving element lifts said up-down mechanism along said first and second slanted bottom surfaces when said driving element drives said movable element to move from said second position to said first position.

10. A keyboard, comprising:
   a casing;
   at least one elevatable key switch, disposed on said casing, comprising:
      a base disposed on said casing;
      a driving element, coupled to said base and comprising a supporting portion, said supporting portion being disposed on said driving element and projecting from said base;
      a cap disposed above said base;
      an up-down mechanism, disposed between said base and said cap, configured to support said cap to perform vertical movement relative to said base;
      an elastic member disposed on said base; and
      a movable element movably disposed on said elastic member, configured to move responsive to movement of said supporting portion;
      wherein said movable element supports said up-down mechanism in an operation configuration when said driving element drives said movable element to substantially move to a first position, and wherein said movable element releases said up-down mechanism entering a contraction configuration when said driving element drives said movable element to substantially move to a second position.

11. The keyboard according to claim 10, wherein said up-down mechanism comprises a first arm and a second arm, said first arm is pivotally connected to said second arm to form a scissors-like linkage.

12. The keyboard according to claim 10, wherein said movable element and said driving element are formed integrally, so that said movable element moves responsive to movement of said driving element.

13. The keyboard according to claim 10, wherein said up-down mechanism further comprises a projection, said movable element has a receiving portion, wherein said receiving portion receives said projection when said movable element is in said first position, and wherein said receiving portion releases said projection when said movable element is in said second position.

14. The keyboard according to claim 13, wherein said movable element further comprises an accommodation portion configured to accommodate said projection when said movable element is in said second position.

15. The keyboard according to claim 13, wherein said projection has a slanted bottom surface, and wherein said driving element lifts said up-down mechanism along said slanted bottom surface when said driving element drives said movable element to move from said second position to said first position.

16. The keyboard according to claim 11, wherein said base further comprises a connection part, a lower end of said first arm is coupled to said connection part, said driving element has a upward slanted surface corresponding to said lower end of said first arm, and wherein said upward slanted surface pushes said lower end toward said second position when said driving element drives said movable element to move from said first position to said second position.

17. The keyboard according to claim 10, wherein said movable element has a groove portion coupling to said supporting portion of said driving element, so that said movable element moves responsive to movement of said driving element.

18. The keyboard according to claim 10, wherein said driving element has an opening, said supporting portion is disposed on periphery defined by said opening, said elastic member is disposed on said base through said opening.

19. An elevatable key switch, comprising:
   a base;
   a cap disposed above said base;
   a scissors-like structure, disposed between said base and said cap, configured to support said cap to perform vertical movement relative to said base, said scissors-like structure comprising a first arm having a first opening and a second arm having a second opening;
   an elastic member disposed on said base; and
   a movable element substantially horizontally movably disposed on said elastic member, said movable element comprising a receiving portion;
   wherein said receiving portion supports said scissors-like structure in an operation configuration when said movable element is in a first position, and wherein said movable element is substantially paralleledly received in said first and said second openings to release said scissors-like structure entering a contraction configuration when said movable element is in a second position.

20. The elevatable key switch according to claim 19 further comprising a driving element, substantially horizontally movably disposed on said base, wherein said driving element couples to said movable element and is configured to drive said movable element to make substantial horizontal movement, so that said movable element selectively moves between said first position and said second position.

21. The elevatable key switch according to claim 20, wherein said movable element and said driving element are formed integrally, so that said movable element moves responsive to movement of said driving element.

22. The elevatable key switch according to claim 20, wherein said base further comprises a connection part, said first arm is slidably rotatably coupled to said connection part, a lower end of said first arm is arranged against said driving element, said driving element has an upward slanted surface corresponding to said lower end, said upward slanted surface pushes said lower end toward said second position when said driving element drives said movable element to move from said first position to said second position.

23. The elevatable key switch according to claim 19, wherein said scissors-like structure comprises a projection, said projection has a slanted bottom surface, said driving element lifts said scissors-like structure along said slanted bottom surface when said driving element drives said movable element to move from said second position to said first position.

24. The elevatable key switch according to claim 23, wherein said movable element further comprises an accommodation portion configured to accommodate said projection when said movable element is in said second position.

* * * * *